US009014393B2

(12) United States Patent
Huh et al.

(10) Patent No.: US 9,014,393 B2
(45) Date of Patent: Apr. 21, 2015

(54) STATIONARY APPARATUS FOR PORTABLE ELECTRONIC DEVICE

(75) Inventors: Byungmu Huh, Seoul (KR); Kyoungjoung Kim, Gyeonggi-Do (KR); Yuonui Chong, Seoul (KR)

(73) Assignee: LG Electronics Inc., Seoul (KR)

( * ) Notice: Subject to any disclaimer, the term of this patent is extended or adjusted under 35 U.S.C. 154(b) by 610 days.

(21) Appl. No.: 13/445,744

(22) Filed: Apr. 12, 2012

(65) Prior Publication Data
US 2013/0016850 A1 Jan. 17, 2013

Related U.S. Application Data

(60) Provisional application No. 61/507,815, filed on Jul. 14, 2011.

(51) Int. Cl.
*H04R 1/02* (2006.01)
*B60R 11/02* (2006.01)
*B60R 11/00* (2006.01)

(52) U.S. Cl.
CPC ............ *B60R 11/02* (2013.01); *B60R 11/0241* (2013.01); *B60R 2011/0082* (2013.01); *B60R 2011/0092* (2013.01); *B60R 2011/0005* (2013.01); *B60R 2011/0071* (2013.01); *B60R 2011/0085* (2013.01)

(58) Field of Classification Search
USPC ........................................... 381/87, 386, 395
See application file for complete search history.

(56) References Cited

U.S. PATENT DOCUMENTS 7,580,254 B2 * 8/2009 Anderson ................ 361/679.41
8,708,296 B2 * 4/2014 Nemoto .................... 248/346.06

FOREIGN PATENT DOCUMENTS

| DE | 298 17 614 U1 | 1/1999 |
|----|---|---|
| EP | 1 803 608 A1 | 7/2007 |
| FR | 2 939 998 A1 | 6/2010 |
| KR | 20-0315567 Y1 | 6/2003 |

* cited by examiner

*Primary Examiner* — Davetta W Goins
*Assistant Examiner* — Amir Etesam
(74) *Attorney, Agent, or Firm* — Birch, Stewart, Kolasch & Birch, LLP

(57) ABSTRACT

A withdrawable portable device mounting apparatus is provided in a vehicle audio system, in which a mount capable of mounting a portable electronic device is drawn out using an electromotive force with a very simple manipulation by pressing a drive button or the like. The apparatus may include a case, a front panel provided at a front surface of the case to have a control panel, a mounting unit loading hole, and a loading button, a drive unit configured to drive a mounting unit through a mounting unit loading hole of the front panel in a withdrawable manner, a loading unit mutually operated with the drive unit to allow the mounting unit to be drawn in or out, and a mounting unit inserted into the front panel in a folded state during a drawing-in operation, and unfolded through the mounting unit loading hole during a drawing-out operation.

19 Claims, 15 Drawing Sheets (a)

(b)

(a)

(b)

(c)

STATIONARY APPARATUS FOR PORTABLE ELECTRONIC DEVICE

CROSS-REFERENCE TO RELATED APPLICATIONS

The present disclosure relates to subject matter contained in preliminary U.S. application Ser. No. 61/507,815, filed on Jul. 14, 2011, which is herein expressly incorporated by reference in its entirety.

BACKGROUND OF THE INVENTION

1. Field of the Invention

The present disclosure relates to a withdrawable portable device mounting apparatus provided in an vehicle audio system, and more particularly, to a withdrawable portable device mounting apparatus in which a mount capable of mounting a portable electronic device is drawn out using an electromotive force with a very simple manipulation by pressing a drive button or the like such that an upper and a lower mounting member are unfolded in the vertical direction by a torsion spring to mount a portable electronic device, and the mount is automatically drawn in while the upper and the lower mounting member are folded during the drawing-in operation.

2. Description of the Related Art

In general, devices such as portable or mobile phones, MP3 players, portable video players, and the like have been indispensable devices in our daily life, and portable or mobile phones of them are widely used for users ranging from young children to elderly persons.

Such mobile phones may be carried by users for the purpose of mainly making phone calls to the other party, but may be also used to send and receive texts in addition to the phone calls or capture a self portrait image using a camera function configured in the mobile phone. In recent years, MP3, video player, and DMB functions have been further added to the mobile phone to perform various functions other than simple phone calls or text message transmissions.

In recent years, portable electronic devices having a large-sized liquid crystal display have been widely used. For example, such a large-sized liquid crystal display has been also employed for general mobile phones in addition to iPods, iPhones, and smart phones.

Furthermore, a wide function has been added to such a mobile phone to watch DMB TV or video clips with a wide screen by adding a DMB or video player function to the mobile phone. In case of touch phones, iPhones or the like, which have been recently appeared on the market, when a mobile phone is positioned in the horizontal direction while watching DMB TV or video clips, a display screen of the mobile phone may be automatically switched to a wide screen format to provide a wide screen for the user.

However, when the user watches DMB TV or video clips using a wide screen switched to a wide screen format, there is a drawback that the user has to continuously hold a mobile phone in his or her hand in the state of being positioned in the horizontal direction.

In other words, since an additional support means supporting a mobile phone is not provided on the mobile phone itself, the user should hold an edge of the mobile phone in his or her one or both hands in the state of being positioned in the horizontal direction while watching DMB TV or video clips with a wide screen, thereby causing wrist-ache or shoulder-ache when the user's hand is overstrained or in the worst case.

Moreover, while the user is not moving, a mobile phone should be held such that a screen of the mobile phone corresponds to the user's eye position when watching DMB TV or video clips using the mobile phone, thereby causing difficulties while watching DMB TV or video clips using the mobile phone.

Meanwhile, though a mount capable of mounting a mobile phone has been previously contrived, such mounts for a mobile phone are mostly used in the state of being attached to a vehicle. Such mounts have been developed only with the emphasis on guiding the driver to safely drive a vehicle while using a mobile phone during driving, and thus problems caused while watching DMB TV or video clips using a wide screen have not been solved at all.

According to the related art, a mobile phone shoulder mount disclosed in Korean Utility Model No. 20-0315567 has been contrived, and the mobile phone shoulder mount may include a pedestal unit closely attached to a mobile phone user's shoulder in the state that a shock-absorbing member for enhancing the feeling of cushion and preventing slippage at a bottom surface thereof is adhered thereto, a mobile phone mounting unit having a rectangular plate, a magnet adhered to a central portion of the rectangular plate, and a plurality of engaging protrusions adhered along an upper circumference of the rectangular plate wherein an external surface of the keypad portion of the mobile phone is detachably adhered to the magnet, and a support unit having a body and a ring connected to a tip end portion of the body, connected to an upper end of the pedestal unit through the body, and detachably adhered to the rectangular plate of the mobile phone mounting unit through the ring.

According to the related art, a mobile phone is mounted on a mounting unit, and the mounting unit mounted with the mobile phone is rotated, thereby allowing the mobile phone to be rotated in the state of being mounted. However, as a structure for mounting a mobile phone on the mounting unit is mounted by a magnet, a steel plate corresponding to a magnetic force of the magnet provided at the mounting unit should be provided at the mobile phone, thereby having a problem that an external appearance of the mobile phone cannot be elegantly accomplished by the steel plate.

Such an adverse effect on an external appearance of the mobile phone, which is exhibited by further providing a steel plate as described above, may be easily disapproved and thus cannot be widely utilized by users who desired to elegantly or simply provide the appearance of the mobile phone.

Moreover, according to the related art, a mount for mounting a mobile phone may be configured to be placed and used between a user's shoulder and face to allow the user to freely use his or her both hands and write a memo or perform other tasks while making a phone call, thereby having problems caused when watching DMB TV or video clips using a wide screen of the mobile phone as described above.

Incidentally, apparatuses for mounting such portable electronic devices have been developed in various ways, and thus those apparatuses may have various shapes to occupy a predetermined space according to the shape of the portable devices.

In particular, when a mounting apparatus is provided in the state of being externally exposed in a limited small space such as the interior of a vehicle, the relevant mounting apparatus may be formed of various shapes, and in this case, the mounting apparatus may be protruded when installed as a separate device, thereby having a problem of causing poor appearance and damage when not being used.

Furthermore, the mobile phone mount may be obstructed from the outside or collided with other devices, thereby having a problem of causing damage to those devices._

SUMMARY OF THE INVENTION

An object of the present disclosure is to solve the foregoing problems, and an object of the present disclosure is to provide a withdrawable portable electronic device mounting apparatus for drawing a portable device mounting unit into the apparatus when the mounting unit is not used and drawing the portable device mounting unit out of the apparatus only when the mounting unit is used, thereby allowing the mount to be protruded on the outside only when used and the mount to be drawn in when not used to provide an elegant and simple appearance.

Another object of the present disclosure is to provide a withdrawable portable electronic device mounting apparatus in which a mounting unit is operated to be drawn in or out with a very simple manipulation, thereby promoting a user's convenience.

Still another object of the present disclosure is to provide a withdrawable portable electronic device mounting apparatus incorporated in a vehicle audio system in which the portable electronic device can be mounted while being drawn into or out of the interior with a very simple manipulation in the vehicle audio system.

In order to accomplish the foregoing objective, the present disclosure will be implemented by an embodiment having the following configuration as a preferred aspect. The present disclosure will provide the following technical configuration to solve the foregoing task.

According to an embodiment of the present disclosure, there is provided a portable electronic device mounting apparatus, and the apparatus may include a case; a front panel provided at a front surface of the case to have a control panel, a mounting unit loading hole, and a loading button; a drive unit configured to drive a mounting unit through a mounting unit loading hole of the front panel in a withdrawable manner; a loading unit mutually operated with the drive unit to allow the mounting unit to be drawn in or out; and a mounting unit inserted into the front panel in a folded state during the drawing-in operation, and unfolded through the mounting unit loading hole during the drawing-out operation.

According to another embodiment of the present disclosure, the mounting unit may include an upper mounting member and a lower mounting member folded during the drawing-in operation and unfolded during the drawing-out operation.

Furthermore, the upper mounting member and lower mounting member may include engaging gears, respectively, and the folding and unfolding operation may be implemented by the engaging gears.

In addition, the upper mounting member and lower mounting member may include torsion springs in the respective engaging gear units, and the upper mounting member and lower mounting member may be preferably unfolded by a restoring elastic force during the drawing-out operation.

According to still another embodiment of the present disclosure, the upper mounting member may include an upper body; and a mounting hook formed at an end of the upper body to mount a portable electronic device and then fix it. Here, the mounting hook may include a restraining protrusion to allow a portable electronic device to be mounted thereon and then not released therefrom.

Furthermore, the lower mounting member may include a lower casing mutually hinge-operated with the upper mounting member; an inserting body slidably inserted into the lower casing; and a bottom portion fixed and connected to an end of the lower casing to be electrically connected to a fixed portable electronic device.

Moreover, the lower casing may include a sliding protrusion protruded thereinside, and the inserting body together with a sliding guide rail into which the sliding protrusion is slid may be slidably drawn into the lower casing.

In addition, the lower casing may include a cut-out hole passing therethrough in a length direction, and the inserting body may include a release prevention protrusion passing through the cut-out hole to slidably move back and forth.

Preferably, the lower mounting member may include a tensile elastic member, maintaining a configuration that the inserting body is inserted into the lower casing by a restoring elastic force, and having a restoring elastic force when the inserting body is slidably drawn from the lower casing.

Furthermore, the tensile elastic member may be formed with a restoring extension spring an end of which is fixed to the lower casing, and the other end of which is fixed to the bottom portion.

In addition, the bottom portion may include a tensile spring support to which the other end of the restoring extension spring is fixed.

To this end, the upper mounting member may include a mounting hook, and the lower casing and the inserting body may include mounting hook inserting holes, respectively, such that the mounting hook of the upper mounting member sequentially passes therethrough to be inserted thereinto in a folded state.

Furthermore, the mounting hook may include a folding fixed groove formed to be depressed at an upper surface thereof, and the inserting body may include a mounting hook folding fixed protrusion inserted into the folding fixed groove to prevent the unfolding of the mounting hook in a folded state.

According to yet still another embodiment of the present disclosure, the bottom portion may include a bottom portion body fixed and connected to a lower portion of the inserting body; a bottom portion cover configured to cover the bottom portion body; a connector electrically conducted to a portable electronic device; and a connector supporting member integrally formed with the connector to connect to the bottom portion body.

Furthermore, the connector supporting member may include a rotation shaft, and the bottom portion body may include a rotation shaft hole such that the connector is hinge-rotated around the rotation shaft. Furthermore, the hinge may be revolved at an angle of maximum 15 degrees.

In addition, the bottom portion may include an elastic spring such that the hinge revolution of the connector has an elastic restoring force, and the elastic restoring force may preferably allow the connector to maintain an angle of 15 degrees with the lower casing.

Furthermore, the apparatus according to the present disclosure may further include a mounting rotation member formed between the drive unit and the mounting unit, and provided at a mounting panel of the drive unit to be rotationally operated with the mounting panel, and including a folding shaft which is a hinge shaft of the folding or unfolding operation of the mounting unit.

Here, the folding shaft may include an upper mounting member shaft which is a hinge shaft of the upper mounting member; and a lower mounting member shaft which is a hinge shaft of the lower mounting member.

Furthermore, the apparatus may preferably further include a click hinge cam rotatably combined with a mounting panel of the drive unit to perform a fixed function at an angle of 90 degrees.

According to still yet another embodiment of the present disclosure, the drive unit may include a mounting panel mounted with devices in the drive unit to be combined with the case; a drive motor configured to transfer power; a transfer gear configured to transfer a decelerated rotational force of the drive motor; and a loading drive gear to allow a mounting unit to be drawn in or out by a rotational force of the drive motor.

In addition, the loading unit may include a loading gear linearly formed to be engaged with the loading drive gear to move the drive unit back and forth according to the rotation of the loading drive gear.

Furthermore, the loading motor may include a drive shaft gear, and transfer a decelerated rotational force to the loading drive gear through the transfer gear.

Preferably, the drive shaft gear may be formed with a worm gear, and the transfer gear may be formed with a helical gear and a spur gear for deceleration, and the loading drive gear may be formed with a spur gear configured to receive a decelerated rotational force from the transfer gear.

According to yet still another embodiment of the present disclosure, the apparatus may include a power unit configured to supply power; an input unit allowing a user to input whether to operate the apparatus; a mounting unit configured to be automatically drawn in or out by an input function of the input unit to mount a portable electronic device during the drawing-out operation; a drive unit configured to receive power to perform the operation of drawing in or out the mounting unit; and a controller configured to drive the drive unit according to a signal of the input unit to allow the mounting unit to be drawn in or out.

To this end, the mounting unit may include an upper mounting member and a lower mounting member, and the upper mounting member and lower mounting member may include engaging gears at end portions thereof, respectively, and may have a restoring moment in the direction of being unfolded by torsion springs thereof, respectively, to be folded during the drawing-in operation and unfolded during the drawing-out operation.

According to still yet another embodiment of the present disclosure, there is provided a withdrawable portable electronic device mounting apparatus incorporated in a vehicle audio system, and the apparatus may include a case of the audio system provided in the interior of a vehicle; a front panel of the vehicle audio system; a power unit configured to receive power from the power of the vehicle; a mounting unit configured to be automatically drawn in or out by an input function of the input unit to mount a portable electronic device during the drawing-out operation; a drive unit provided within the case to receive power and perform the operation of drawing in or out the mounting unit; and a controller configured to drive the drive unit to allow the mounting unit to be drawn in or out.

To this end, the front panel may include an input unit allowing a user to input whether the mounting unit is drawn in or out, and may preferably include a mounting unit loading hole to allow the mounting unit to be drawn in or out.

In addition, the input unit may be formed with an input button provided on the front panel.

Furthermore, the mounting unit may include an upper mounting member and a lower mounting member, and the upper mounting member and lower mounting member may include engaging gears at end portions thereof, respectively, and have a restoring moment in the direction of being unfolded by torsion springs thereof, respectively, to be folded during the drawing-in operation and unfolded during the drawing-out operation.

To this end, the mounting unit may be placed under restraint in a configuration that both ends of the upper mounting member and lower mounting member are folded when the mounting unit is drawn in through the mounting unit loading hole, and both ends of the upper mounting member and lower mounting member may be opened to be unfolded by a restoring elastic force when the mounting unit is drawn out.

As described above, according to the present disclosure, the following effects can be promoted by the foregoing task solving means, and the configurations, combinations, and working relations which will be described later.

According to the present disclosure, there is provided a portable device mounting apparatus for drawing a mounting unit into the apparatus when the mounting unit is not used and drawing the mounting unit out of the apparatus when used, thereby allowing the mount to be protruded on the outside only when used and the mount to be drawn in when not used to provide an elegant and simple appearance.

According to the present disclosure, a mounting unit may be operated to be drawn in or out with a very simple manipulation to promote a user's convenience, and when the mount is not used, the mounting unit protruded on the outside does not exist and thus a collision with other devices does not occur, thereby preventing the mounting unit from being damaged or obstructed.

According to the present disclosure, there is provided a withdrawable portable electronic device mounting apparatus incorporated in a vehicle audio system in which the portable electronic device can be mounted while being drawn into or out of the interior with a very simple manipulation in the vehicle audio system.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a front view illustrating a configuration that a mounting apparatus according to the present disclosure is drawn in;

DETAILED DESCRIPTION OF THE INVENTION

Hereinafter, a withdrawable portable electronic device mounting apparatus according to a preferred embodiment of the present disclosure will be described in detail with reference to the accompanying drawings.

Prior to the description, it should be noted that terms and words used in the description and claims must not be limited and interpreted to be typical or literal, and should be construed as the meaning and concept conforming to the technical concept of the invention on the basis that the inventor can define the concept of the terms and words to describe the invention in a best way.

Accordingly, since the embodiments described in the present invention and configurations shown the drawings are the most preferred embodiments only and do not represent all of technical concept of the invention, it should be understood that there may be various equivalents and modification examples that may replace them at the time of application of present invention.

Hereinafter, preferred embodiments of the present disclosure will be described in detail with reference to FIGS. 1 through 19.

Figure 1:
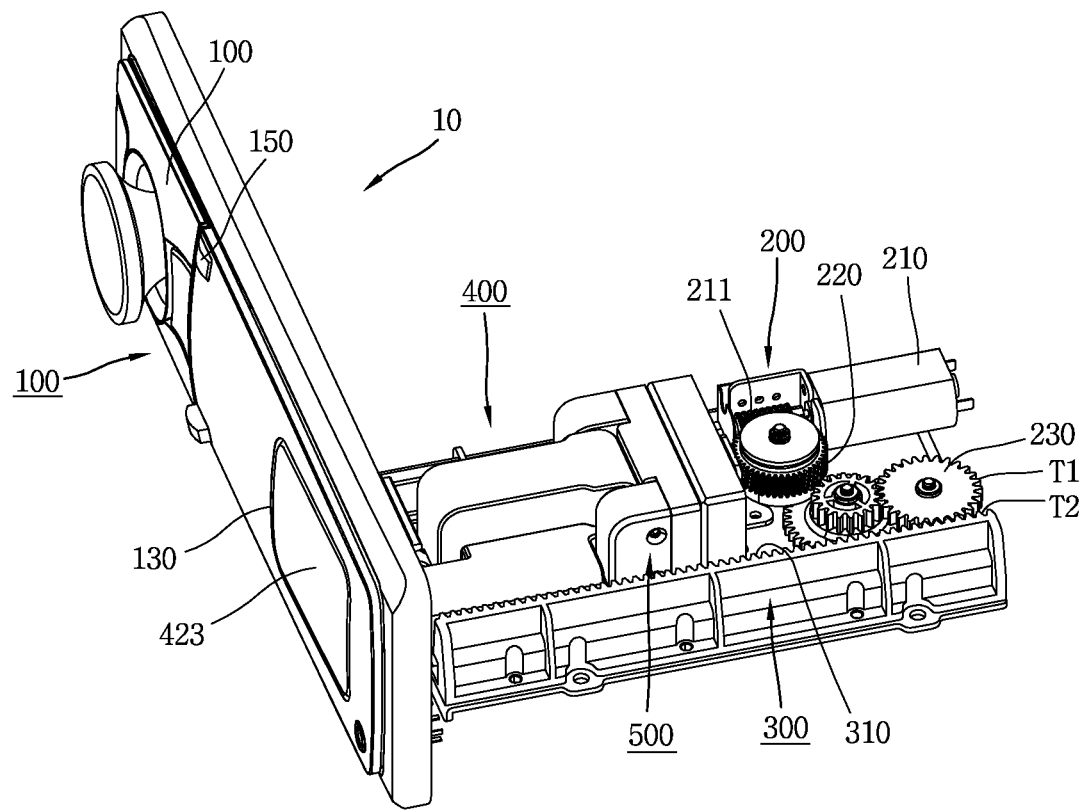
FIGS. 1 and 2 are internal perspective views illustrating a withdrawable portable electronic device mounting apparatus according to the present disclosure.
Figure 2:
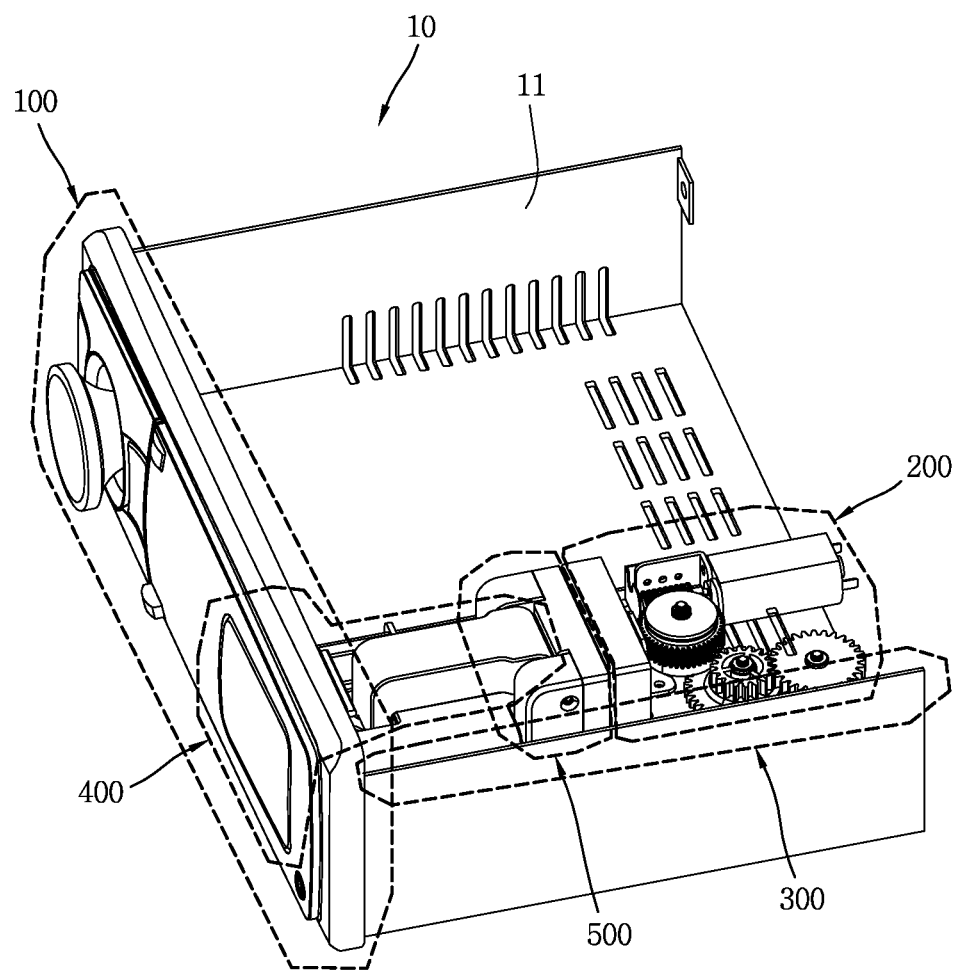
Figure 3:
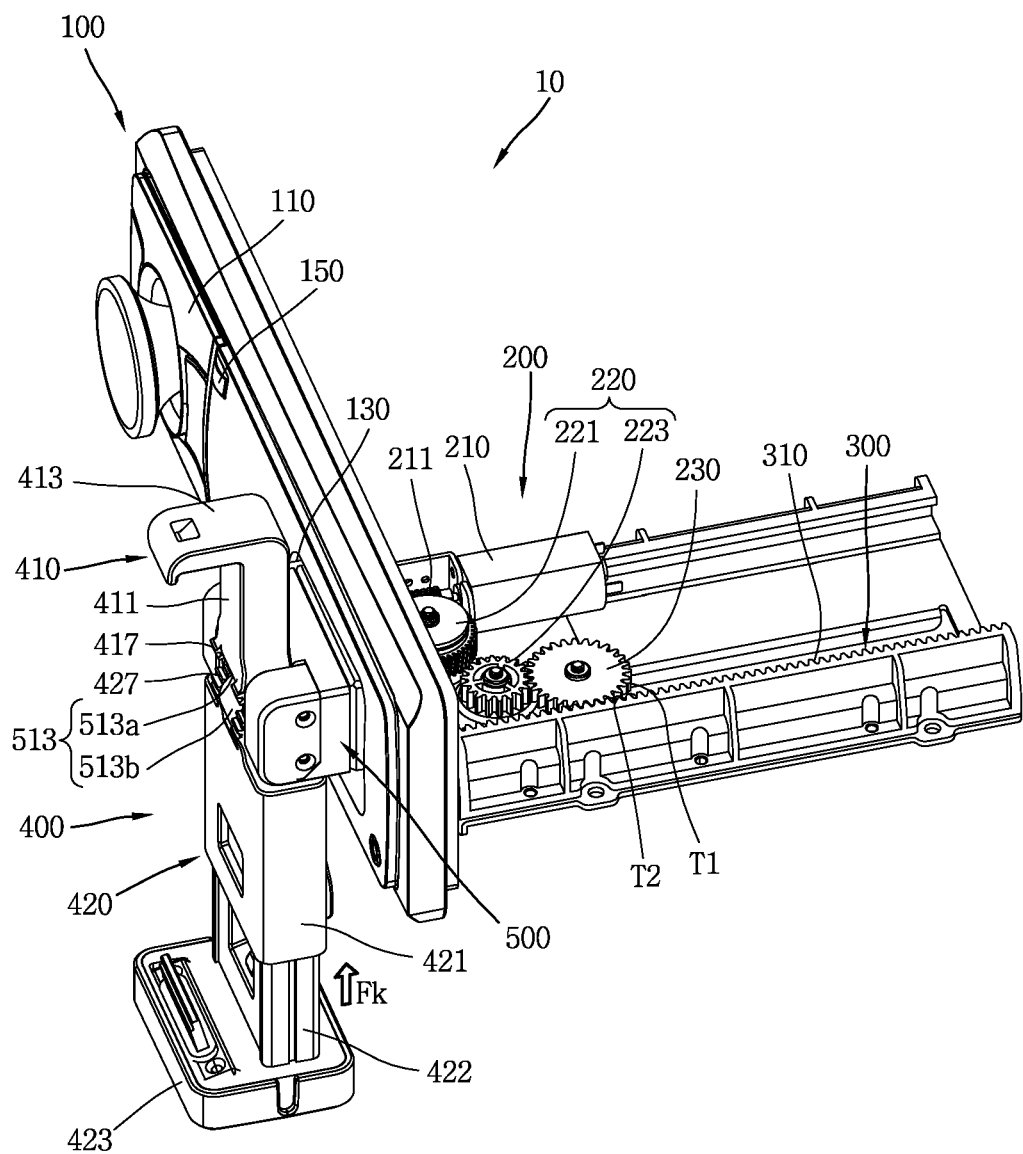
FIG. 3 is a perspective view illustrating a configuration that a withdrawable portable electronic device mounting apparatus according to the present disclosure is drawn out.
Figure 4:
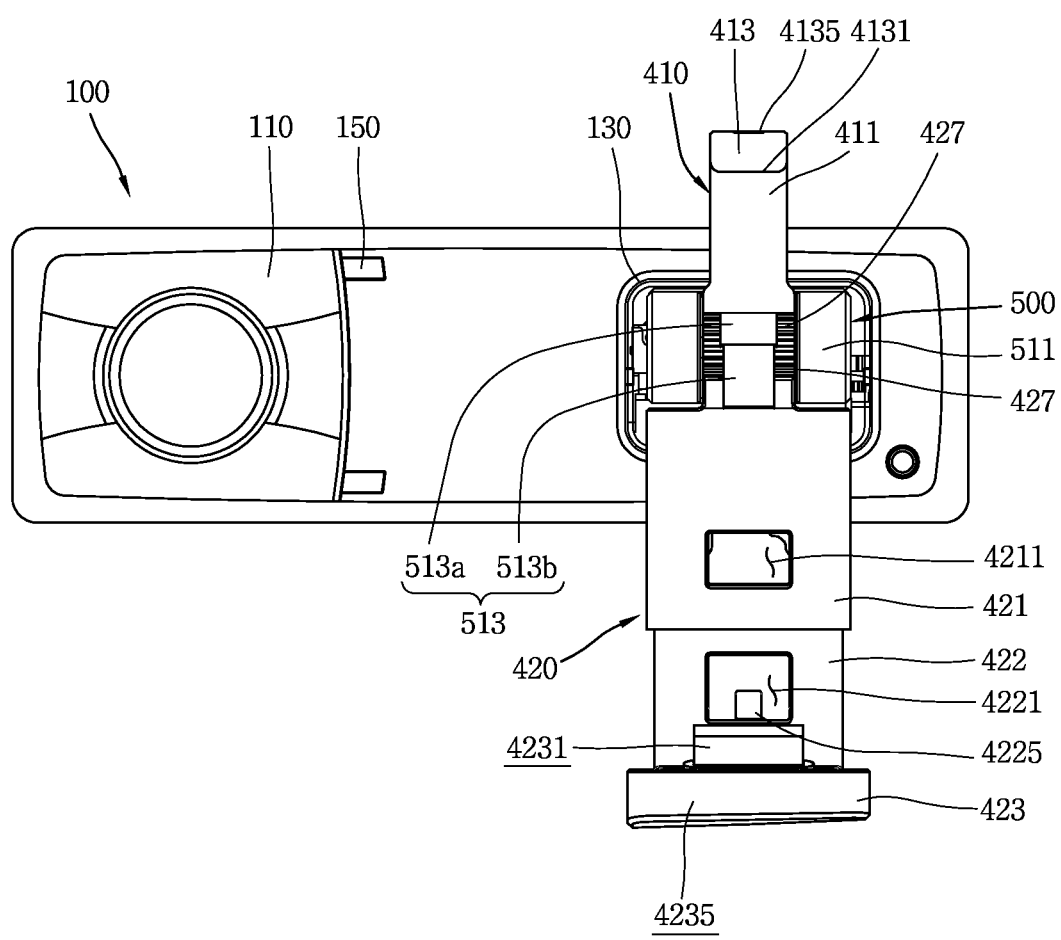
FIG. 4 is a front view illustrating a configuration that a withdrawable portable electronic device mounting apparatus according to the present disclosure is drawn out.
Figure 5:
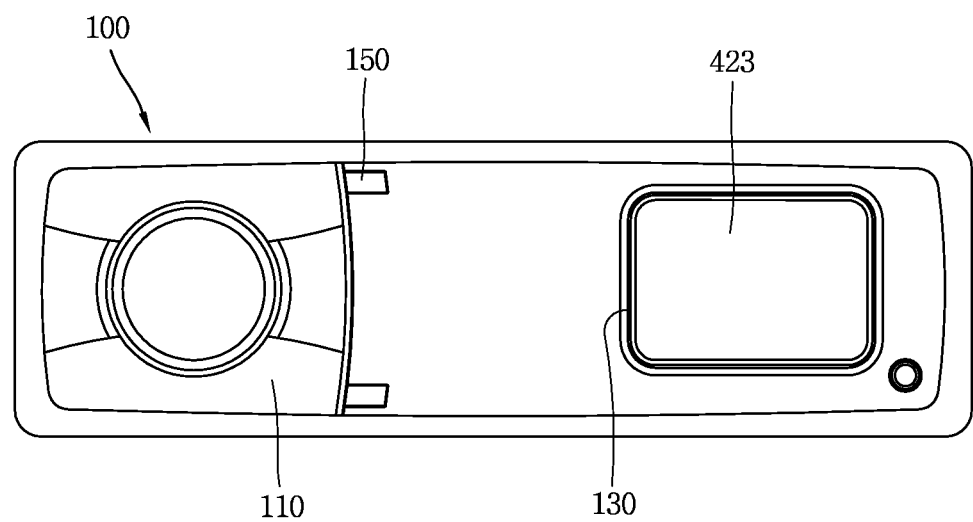
Figure 6:
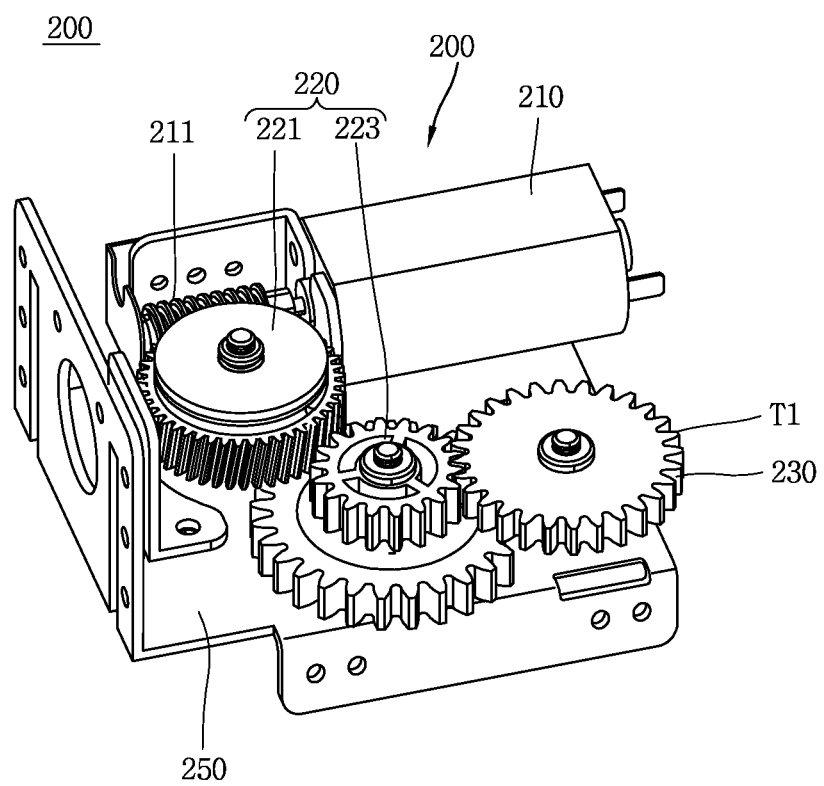
FIG. 6 is a perspective view illustrating a drive unit according to the present disclosure.
Figure 7:
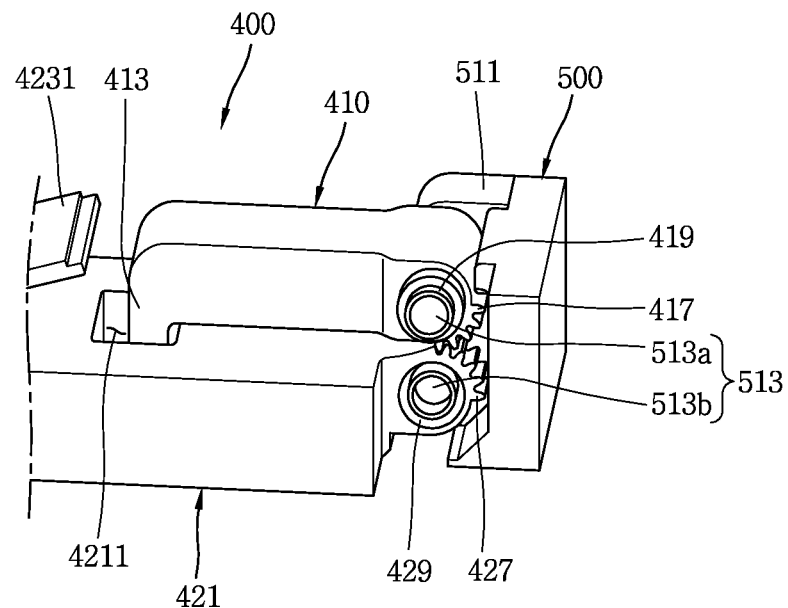
FIGS. 7 and 8 are perspective views illustrating a mounting unit and a mounting rotation member according to the present disclosure.
Figure 8:
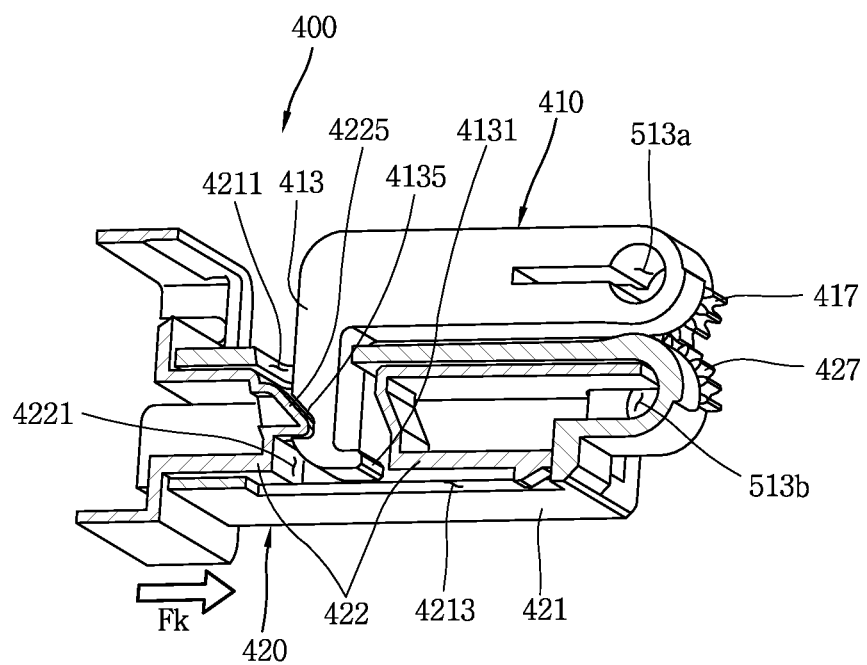
Figure 9:
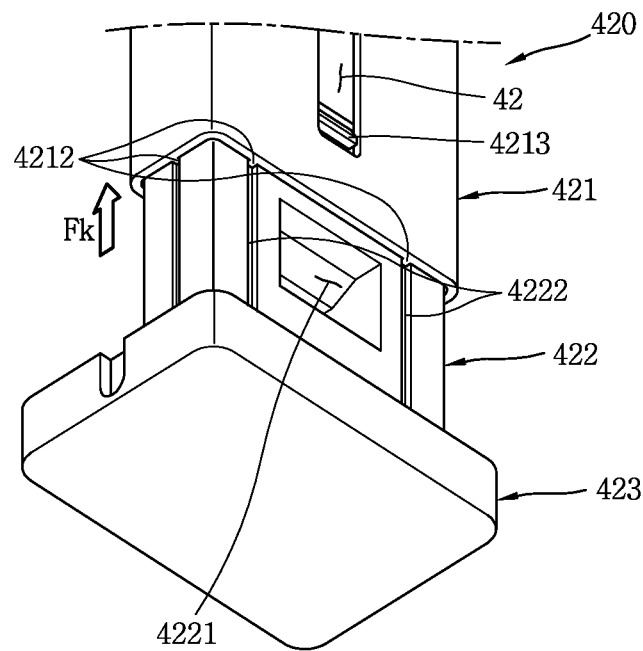
FIGS. 9 and 10 are perspective views illustrating a lower mounting member of the mounting unit according to the present disclosure.
Figure 10:
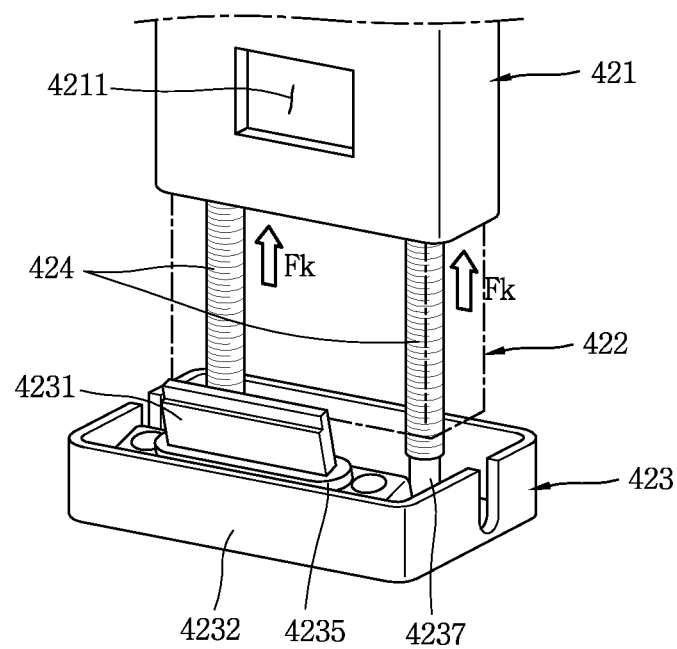
Figure 11:
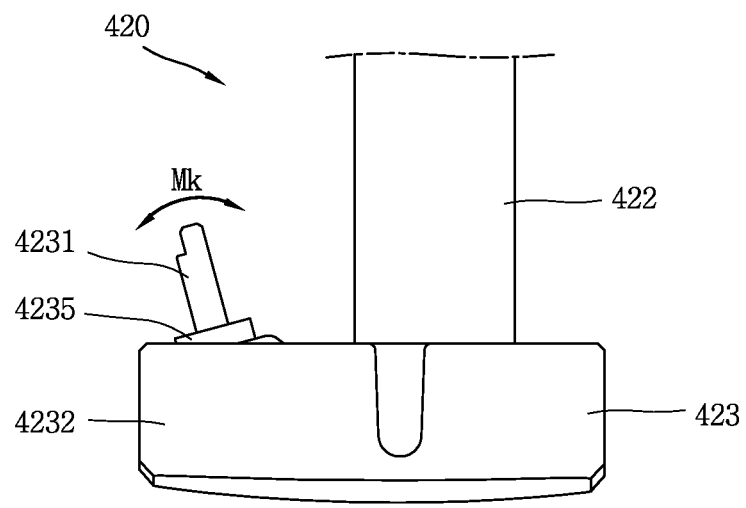
FIGS. 11 and 12 are perspective views illustrating a connector portion in a lower mounting member according to the present disclosure.
Figure 12:
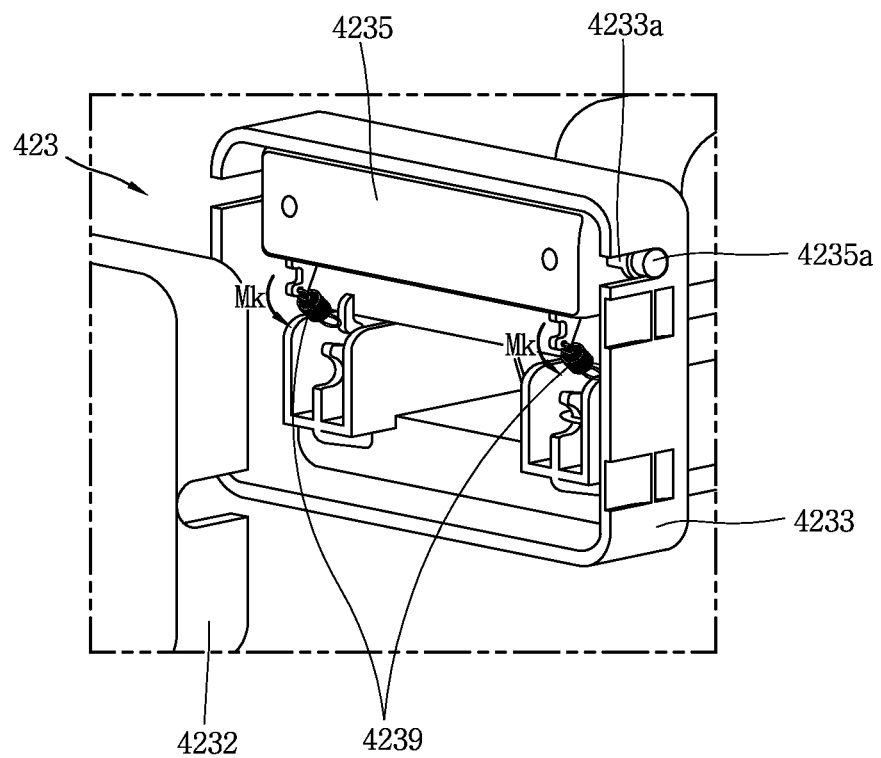
Figure 13:
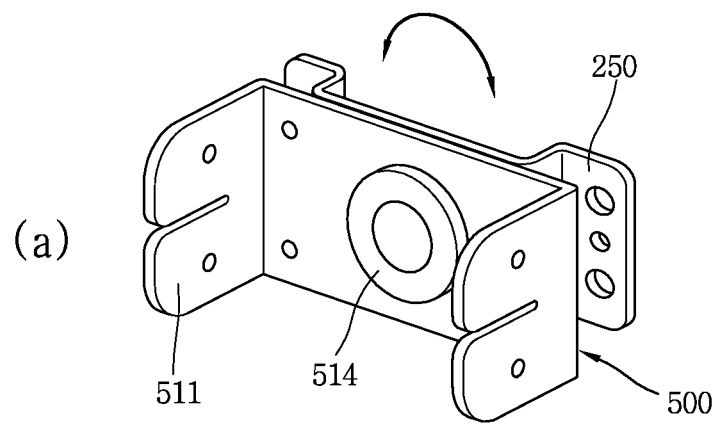
FIGS. 13 and 14 are views illustrating the rotational operation of a mounting rotation member according to the present disclosure.
Figure 13:
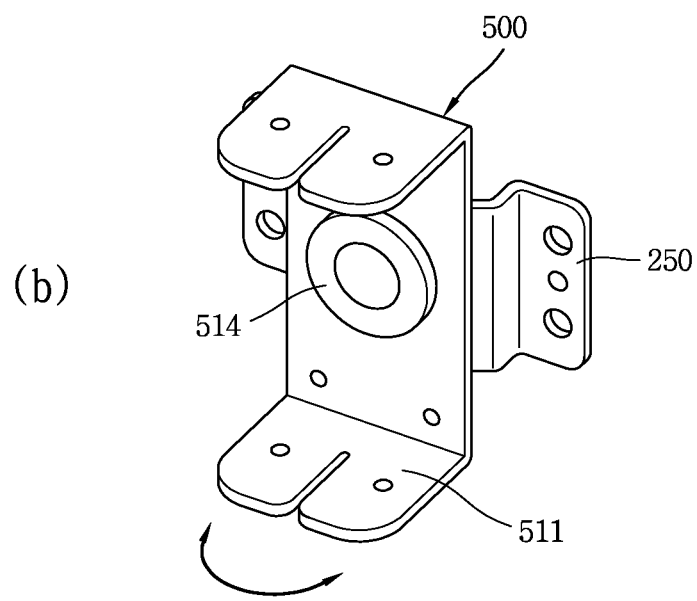
Figure 14:
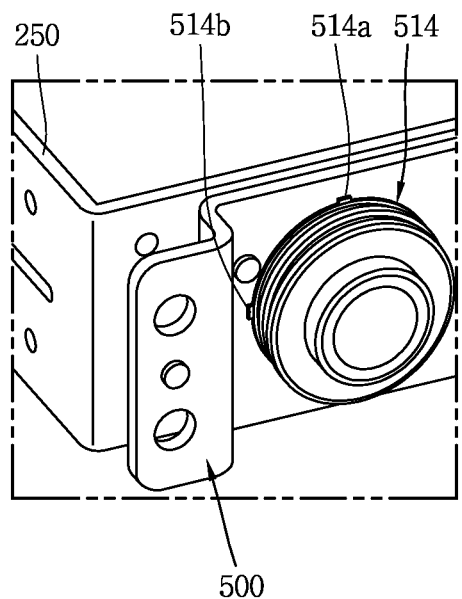

FIGS. 1 and 2 are internal perspective views illustrating a withdrawable portable electronic device mounting apparatus according to the present disclosure, and FIG. 3 is a perspective view illustrating a configuration that a withdrawable portable electronic device mounting apparatus according to the present disclosure is drawn out, and FIG. 4 is a front view illustrating a configuration that a withdrawable portable electronic device mounting apparatus according to the present disclosure is drawn out, and FIG. 5 is a front view illustrating a configuration that a mounting apparatus according to the present disclosure is drawn in, and FIG. 6 is a perspective view illustrating a drive unit according to the present disclosure, and FIGS. 7 and 8 are perspective views illustrating a mounting unit and a mounting rotation member according to the present disclosure, and FIGS. 9 and 10 are perspective views illustrating a lower mounting member of the mounting unit according to the present disclosure, and FIGS. 11 and 12 are perspective views illustrating a connector portion in a lower mounting member according to the present disclosure, and FIGS. 13 and 14 are views illustrating the rotational operation of a mounting rotation member according to the present disclosure.

Referring to FIGS. 1 and 2, a portable electronic device mounting apparatus 10 according to an embodiment of the present disclosure may include a case 11; a front panel 100 provided at a front surface of the case to have a control panel 110, a mounting unit loading hole 130, and a loading button 150; a drive unit 200 configured to drive a mounting unit 400 through a mounting unit loading hole 130 of the front panel 100 in a withdrawable manner; a loading unit 300 mutually operated with the drive unit 200 to allow the mounting unit 400 to be drawn in or out; and a mounting unit 400 inserted into the front panel 100 in a folded state during the drawing-in operation, and unfolded through the mounting unit loading hole 130 during the drawing-out operation.

The case 11 may form an external case of a car audio system or separate device in which the mounting apparatus of the invention is provided as illustrated in FIG. 2, wherein the drive unit 200 is inserted therein, and the mounting unit 400 is drawn into or out of the mounting apparatus The front panel 100, as a panel constituting a front portion of the case 11 in which the mounting unit and drive portion of the invention are provided as illustrated in FIGS. 1 and 2, may be provided with an input unit typically performing the drawing-in/out operation of the mounting unit 400 to serve as a manipulation panel for performing various functions when served as an audio system or the like.

Referring to FIG. 5, the front panel 100 may include a control panel 110 for the user's manipulation, a mounting unit loading hole 130 allowing the mounting unit 400 to be drawn in or out, and a loading button 150 as an input unit for manipulating the loading of the mounting unit.

The mounting unit loading hole 130 may be formed as a through hole having a rectangular shape with round edges as illustrated in FIG. 5, and a bottom portion 423 forming a bottom plate of the mounting unit 400 can be drawn therein in an exposed state.

The loading button 150 may be formed as a switch provided at the side of the control panel 110 to function as a means capable of inputting a command indicating whether or not the mounting unit 400 is loaded as illustrated in FIG. 5, and the location thereof may be not only installed at the front panel 100, but also installed anywhere other than the apparatus, for the sake of the user's convenience.

The drive unit 200 is provided within the case 11 as illustrated in FIGS. 2 and 3, and the drive unit 200 may move back and forth in the forward and backward direction according to the operation of a drive motor 210. Accordingly, the mounting unit 400 coupled with the drive unit 200 can be drawn into or out of the case 11 through the mounting unit loading hole 130. To this end, the drive unit 200 may include a drive motor 210 and a plurality of gears.

The loading unit 300 may include a loading gear 2310 formed at a side of the case 11 as illustrated in FIGS. 1 through 3, and the loading unit 300 may be engaged with a gear of the drive unit 200 to allow the drive unit 200 to move back and forth along the loading unit 300.

Hereinafter, the configurations and working relations of the drive unit 200 and loading unit 300 according to the present disclosure will be described in detail with reference to FIGS. 3 and 6.

The drive unit 200 may include a mounting panel 250 on which devices in the drive unit are mounted to move back and forth in the case 11; a drive motor 210 configured to transfer power; a transfer gear 220 configured to transfer a decelerated rotational force of the drive motor; and a loading drive gear 230 to allow a mounting unit to be drawn in or out by a rotational force of the drive motor.

Referring to FIG. 6, the drive motor 210 may include a drive shaft gear 211 at the motor shaft, and a plurality of the transfer gears 220 are provided to transfer a decelerated rotational force to the loading drive gear 230 through the transfer gears.

Preferably, the drive shaft gear 211 is formed with a worm gear, and the transfer gear 220 is formed with a helical gear 221 for receiving a rotational force from the worm gear, which is the drive shaft gear, and a spur gear for reducing speed 223. Furthermore, the loading drive gear 230 may be formed with a spur gear for receiving a decelerated rotational force from the transfer gears 221, 223.

The spur gear for reducing speed 223 is formed with a two-step spur gear having different shaft diameters as illustrated in FIG. 6, thereby reducing the speed of rotation received from the helical gear 221 and transfer it to the loading drive gear 230.

Furthermore, the loading unit 300 may include a loading gear 310 linearly formed to be engaged with the loading drive gear 230 to move the drive unit 200 back and forth according to the rotation of the loading drive gear 230. More specifically, the teeth (T1) of the loading drive gear 230 may be engaged with the teeth (T2) of the loading gear 310 of the loading unit 300, thereby allowing the entire drive unit 200 to move back and force along the loading unit 300 integrally formed in the case 11.

The mounting panel 250 is mounted with the drive motor 210, transfer gear 220, and loading drive gear 230 to move back and force in the case 11. To this end, as illustrated in FIGS. 3 and 6, the mounting panel 250 may be preferably installed at a lower surface of the loading unit 300 of the case 11 to move back and force in the forward and backward direction.

Hereinafter, the entire configuration of the invention and the configuration of the mounting unit 400 will be described with reference to FIGS. 3 and 4.

FIGS. 3 and 4 illustrate a configuration in which the mounting unit 400 moves forward along the loading unit 300 by the operation of the loading drive gear 230 of the drive unit 200 to be drawn out. The front panel 100, drive unit 200, and loading unit 300 have been sufficiently described above, and thus the configuration and working relations of the mounting unit 400 will be described below.

The mounting unit 400 may include an upper mounting member 410 and a lower mounting member 420 folded during the drawing-in operation and unfolded during the drawing-out operation.

As illustrated in FIGS. 3 and 4, the upper mounting member 410, which is a hook shaped member bent having a "]" shaped end, provides a member for restraining the upper portion when a portable electronic device such as a smart phone or the like is mounted thereon. Furthermore, the lower mounting member 420 having a "[" shaped end is formed with two members overlapped with each other in a telescopic form, providing a member for restraining the lower portion when a portable electronic device is mounted thereon, and provided with a connector located at the lower portion thereof to connect power or the like. Here, the upper mounting member 410 is formed with a member having a shorter length and smaller width than the lower mounting member 420 to allow the upper mounting member 410 to be inserted into the lower mounting member 420 when they are folded to be drawn in.

Hereinafter, the folding and unfolding structure of the upper mounting member 410 and lower mounting member 420 will be described in detail with reference to FIGS. 7 and 8.

The upper mounting member 410 and lower mounting member 420 may include engaging gears 417, 427, respectively, to be engaged with each other at a folded portion, thereby implementing the folding and unfolding operation by the engaging gears 417, 427. Furthermore, the engaging gears 417, 427 may include torsion springs, respectively, and thus the upper mounting member and lower mounting member may be preferably unfolded by a restoring elastic force during is the drawing-out operation.

Referring to FIG. 7, the engaging gear 417 is formed in a round shape at a folding end of the upper mounting member 410, and the engaging gear 427 corresponding to the engaging gear 417 of the upper mounting member is also formed at a folding end of the lower mounting member 420.

Accordingly, the unfolding operation of the upper mounting member 410 and lower mounting member 420 may be implemented in the sequence of "—", ">", and "|", and the folding operation thereof may be implemented in the reverse sequence.

In addition, a torsion spring 419 is provided at a folding end shaft of the upper mounting member 410, and a torsion spring 429 is also provided at a folding end shaft of the lower mounting member 420. As a result, the respective torsion springs 419, 429 are both provided in the state of exerting a restoring moment to the unfolded state. As illustrated in FIG. 3, if the mounting unit 400 is drawn out, then the upper mounting member 410 and lower mounting member 420 are drawn out to be unfolded by the restoring moments of the torsion springs 419, 429.

Referring to FIGS. 3 and 4, the upper mounting member 410 may include an upper body 411; and a mounting hook 413 formed at an end of the upper body 411 to mount a portable electronic device and then fix it. The upper body 411 is formed to be extended from the engaging gear 417, and the mounting hook 413 protruded in the forward direction is formed at an end portion thereof.

Here, the mounting hook 413 may include a restraining protrusion 4131 protruded in the downward direction to allow a portable electronic device to be mounted thereon and then not released therefrom. As a result, when a portable electronic device such as a smart phone or the like is mounted thereon, the restraining protrusion 4131 can restrain the portable electronic device to prevent an upper end of the portable electronic device from being released in the forward direction.

The lower mounting member 420 may include a lower casing 421 mutually engaged to be hinge-operated with the upper mounting member 410; an inserting body 422 slidably inserted into the lower casing 421; and a bottom portion 423 fixed and connected to an end of the lower casing 422 to be electrically connected to a fixed portable electronic device.

As illustrated in FIG. 4, the lower casing 421 is made of plastic having a penetrated central portion as a whole, and the inserting body 422 can be slidably inserted into the penetrated central portion. Furthermore, the bottom portion 423 is combined with a lower end portion of the inserting body 422 to be orthogonally fixed to each other, thereby providing a "[" shaped end.

FIGS. 9 and 10 are views illustrating a configuration in which the inserting body 422 is slidably drawn into the lower casing 421 in the lower mounting member 420 of the invention, illustrating a configuration that the inserting body 422 is drawn in by the elastic restoring force (Fk) of the tensile elastic member 424.

The lower casing 421 may include a sliding protrusion 4212 protruded at an inner surface thereof in the length direction, and the inserting body 422 may include a sliding guide rail 4222 into which the sliding protrusion 4212 is slid, thereby allowing the inserting body 422 to be slidably inserted into the lower casing 421.

As illustrated in FIG. 9, when the lower casing 421 is slidably combined with the inserting body 422, the inserting body 422 may be inserted into the lower casing 421 by the sliding protrusion 4212 and sliding guide rail 4222, thereby preventing them from being deviated.

Furthermore, the lower casing 421 may include a cut-out hole 4213 passing therethrough in a length direction, and the inserting body 422 may include a release prevention protrusion 4223 passing through the cut-out hole 4213 to slidably move back and forth. Accordingly, when the inserting body 422 is drawn out of the lower casing 421 in the downward direction, the release prevention protrusion 4223 may be caught in a lower end of the cut-out hole 4213, thereby preventing the inserting body 422 from being released.

As illustrated in FIG. 10, the lower mounting member 420 may include a tensile elastic member 424, maintaining a configuration that the inserting body 422 is inserted into the lower casing 421 by a restoring elastic force (Fk), and having a restoring elastic force (Fk) when the inserting body 422 is slidably drawn from the lower casing 421.

The lower mounting member 420 in the mounting unit 400 of the invention maintains a configuration that the lower casing 421 and inserting body 422 are overlapped in an inserted manner by the tensile elastic member 424, and subsequently, a mounting hook inserting hole 4211 of the lower casing and a mounting hook inserting hole 4221 of the inserting body maintain a penetrated configuration.

Preferably, the tensile elastic member 424 may be formed with a restoring extension spring an end of which is fixed to the lower casing 421, and the other end of which is fixed to the bottom portion 423.

Accordingly, the bottom portion 423 may include a tensile spring support 4237 to which the other end of the restoring extension spring is fixed. The tensile spring support 4237 may be formed with a spring fixing device integrally formed on is the bottom portion 423.

Referring to FIGS. 4 and 8, the lower casing 421 and the inserting body 422 may include mounting hook inserting holes 4211, 4221, respectively, such that the mounting hook 413 of the upper mounting member 410 sequentially passes therethrough to be inserted thereinto in a folded state.

As a result, when the upper mounting member 410 and lower mounting member 420 are folded, the mounting hook 413 is inserted into the mounting hook inserting holes 4211, 4221 to be folded in an optimal volume.

Furthermore, the mounting hook 413 may include a folding fixed groove 4135 formed to be depressed at an upper surface thereof, and the inserting body 422 may include a mounting hook folding fixed protrusion 4225 inserted into the folding fixed groove 4135 to prevent the unfolding of the mounting hook 413 in a folded state.

FIG. 8 is a cross-sectional view in which the upper mounting member 410 and the lower mounting member 420 are folded, illustrating a configuration that the inserting body 422 is inserted into the lower casing 421.

Referring to the cross-sectional view of FIG. 8, an upper side of the mounting hook folding fixed protrusion 4225 is formed in an inclined direction to be pressed and then restored by the elasticity of the tensile elastic member 424 when the mounting hook 413 is inserted into the mounting hook inserting hole 4221, and thus engaged and caught in the folding fixed groove 4135. As a result, when the mounting unit 400 of the invention is drawn into the case 11 in a folded state, it may be possible to prevent the folded configuration from being unfolded.

Referring to FIGS. 11 and 12, the bottom portion 423 may include a bottom portion body 4233 fixed and connected to a lower portion of the inserting body 422; a bottom portion cover 4232 configured to cover the bottom portion body; a connector 4231 electrically conducted to a portable electronic device; and a connector supporting member 4235 integrally formed with the connector to connect to the bottom portion body.

The bottom portion 423 is a portion that is exposed through the mounting unit loading hole 130 of the front panel 100 when the mounting unit 400 is drawn in as illustrated in FIG. 1, and thus the material and shape of a lower surface of the bottom portion 423 may be preferably made of the same or similar finished material and shape as an outer portion of the front panel 100.

The connector 4231 is protruded in the upward direction of the bottom portion body 4233 to be connected to a power terminal of the portable electronic device such as a smart phone or the like. Furthermore, the connector 4231 is combined with the bottom portion body 4233 through an integrally formed connector supporting member 4235.

Furthermore, the connector supporting member 4235 may include a rotation shaft 4235a, and the bottom portion body 4233 may include a rotation shaft hole 4233a such that the connector 4231 is hinge-rotated around the rotation shaft 4235a. Furthermore, the hinge may be preferably revolved at an angle of maximum 15 degrees.

In addition, the bottom portion 423 may include an elastic spring 4239 such that the hinge revolution of the connector 4231 has an elastic restoring moment (M k). As illustrated in FIG. 12, an end of the elastic spring 4239 is connected to the connector supporting member 4235, and the other end of the elastic spring 4239 is connected to an inner portion of the bottom portion body 4233.

Accordingly, the elastic restoring moment (Mk) may preferably maintain an angle of 15 degrees with the lower casing. In other words, an end of the connector 4231 is maintained to be inclined in the forward direction when an external force is not applied to the connector 4231 as illustrated in FIG. 11, and the connector 4231 is maintained in the vertical direction when a portable device is closely adhered and fixed to the unfolded mounting unit 400 in a state that the portable device is combined therewith (refer to FIGS. 18 and 19).

Referring to FIGS. 1 and 2, the apparatus may further include a mounting rotation member 500 formed between the drive unit 200 and the mounting unit 400, and provided at a mounting panel 250 of the drive unit 200 to be rotationally operated with the mounting panel 250, and including a folding shaft 513 which is a hinge shaft of the folding or unfolding operation of the mounting unit 400.

When the mounting unit 400 of the invention is drawn out and then a portable device is mounted thereon as illustrated in FIGS. 3 and 4, a vertical mounting function of the portable device will be implemented. However, a horizontal mounting function of the portable device may be required for the sake of the user's convenience, thereby allowing the drawn-out mounting unit 400 to be rotated according to the present disclosure. To this end, the apparatus according to the present disclosure may include a mounting rotation member 500 between the drive unit 200 and the mounting unit 400.

Referring to FIGS. 3 and 4, the mounting unit 400 is combined with the mounting rotation member 500, and thus the folding shaft 513 for a folding operation of the upper mounting member 410 and lower mounting member 420 is provided at a side of the combined mounting unit.

The folding shaft 513 may include an upper mounting member shaft 513a operated as a hinge shaft of the engaging gear 417 of the upper mounting member 410, and a lower mounting member shaft 513b operated as a hinge shaft of the engaging gear 427 of the lower mounting member 420.

As a result, an engaging gear shaft between the upper mounting member and lower mounting member performs an engaging hinge operation at the upper mounting member shaft 513a and lower mounting member shaft 513b by means of pin coupling or the like.

Referring to FIGS. 13 and 14, the mounting rotation member 500 is formed with a rotating body 511 to be rotated 90 degrees for a horizontal mounting function of the portable device. Moreover, the mounting rotation member 500 may include a click hinge cam 514 configured to bring the rotation to a halt with respect to the horizontal or vertical direction while being rotated by 90 degrees. Such a click hinge cam function may be implemented by a hinge structure having a function of allowing the hinge rotation in the related art to be fixed at a predetermined angle.

Accordingly, the click hinge cam 514 may be rotatably combined with the mounting panel 250 of the drive unit 200 to perform a fixed function for an angle of 90 degrees.

Referring to FIG. 14, hinge fixing grooves 514a, 514b may be provided in the vertical and horizontal direction, respectively, on a circumference of the click hinge cam 514. Accordingly, the mounting rotation member 500 may be fixed in the vertical direction or fixed in the horizontal direction while being rotated in contact with the mounting panel 250.

Hereinafter, the working relations of a portable electronic device mounting apparatus 10 according to the present disclosure will be described with reference to FIGS. 15 through 20.

Figure 15:
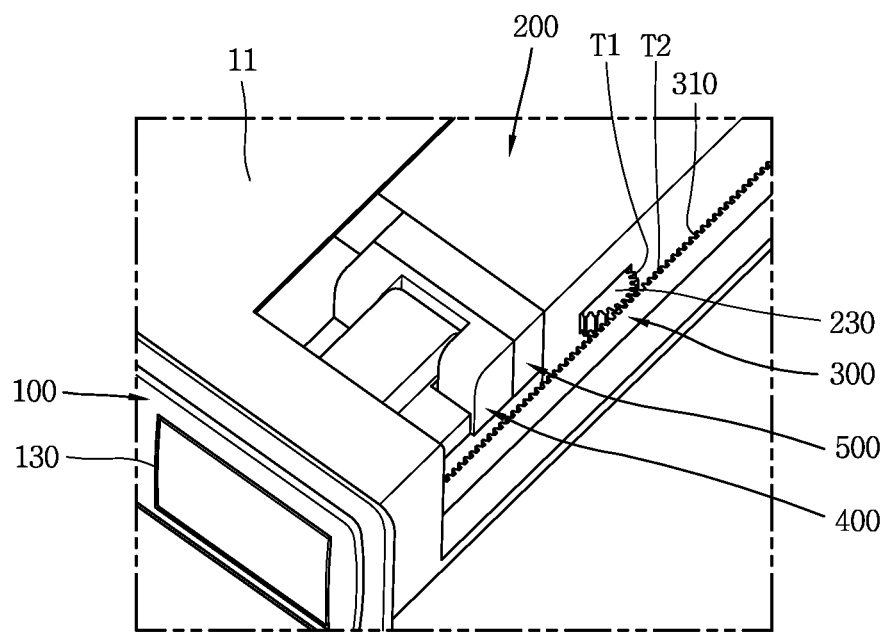
FIG. 15 is a view illustrating a loading unit allowing the mounting apparatus of the invention to be drawn in or out.
Figure 16:
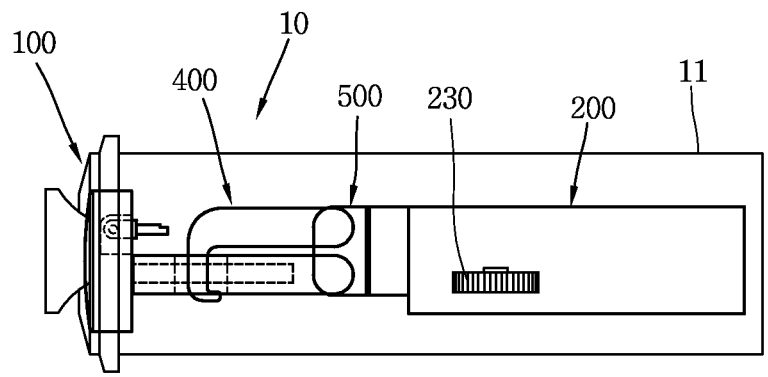
FIGS. 16 and 17 are views illustrating the process of drawing a mounting unit out of the mounting apparatus of the invention.
Figure 16:
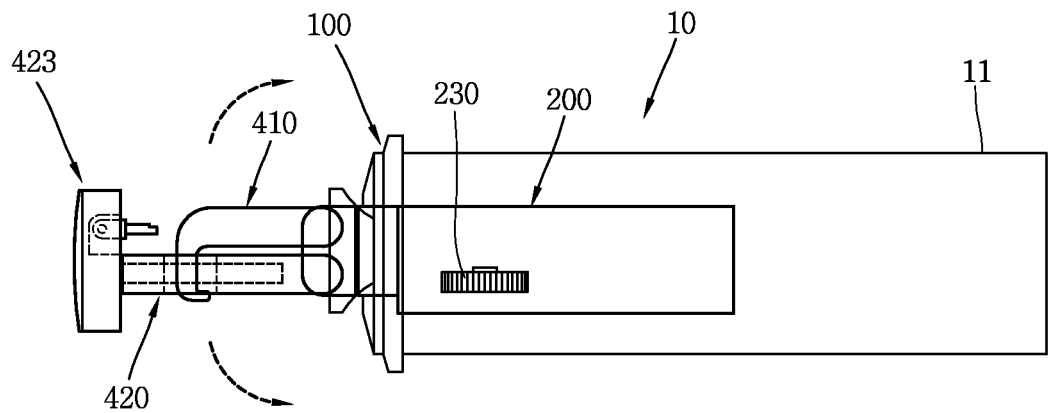
Figure 16:
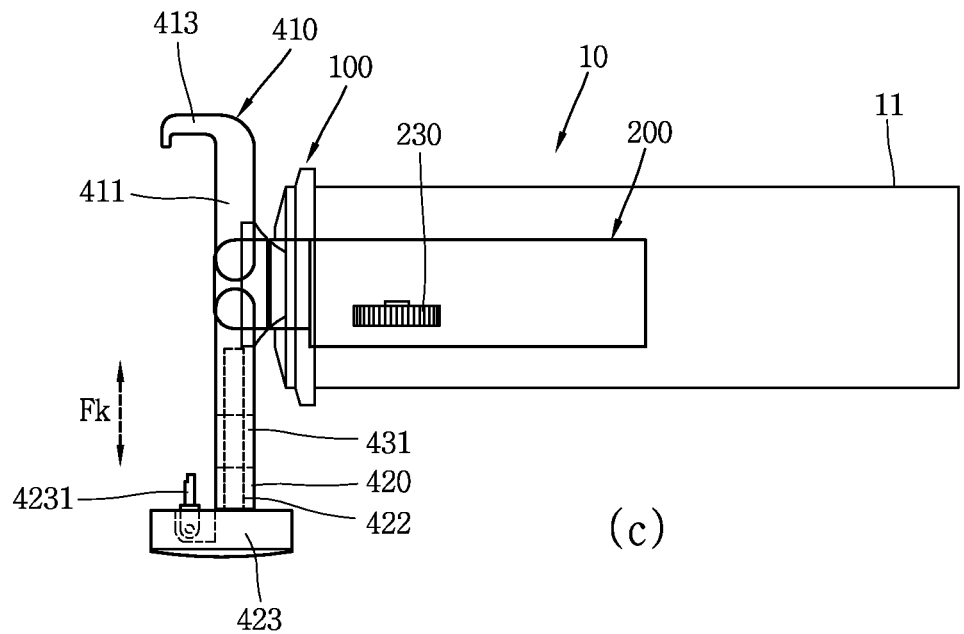
Figure 17:
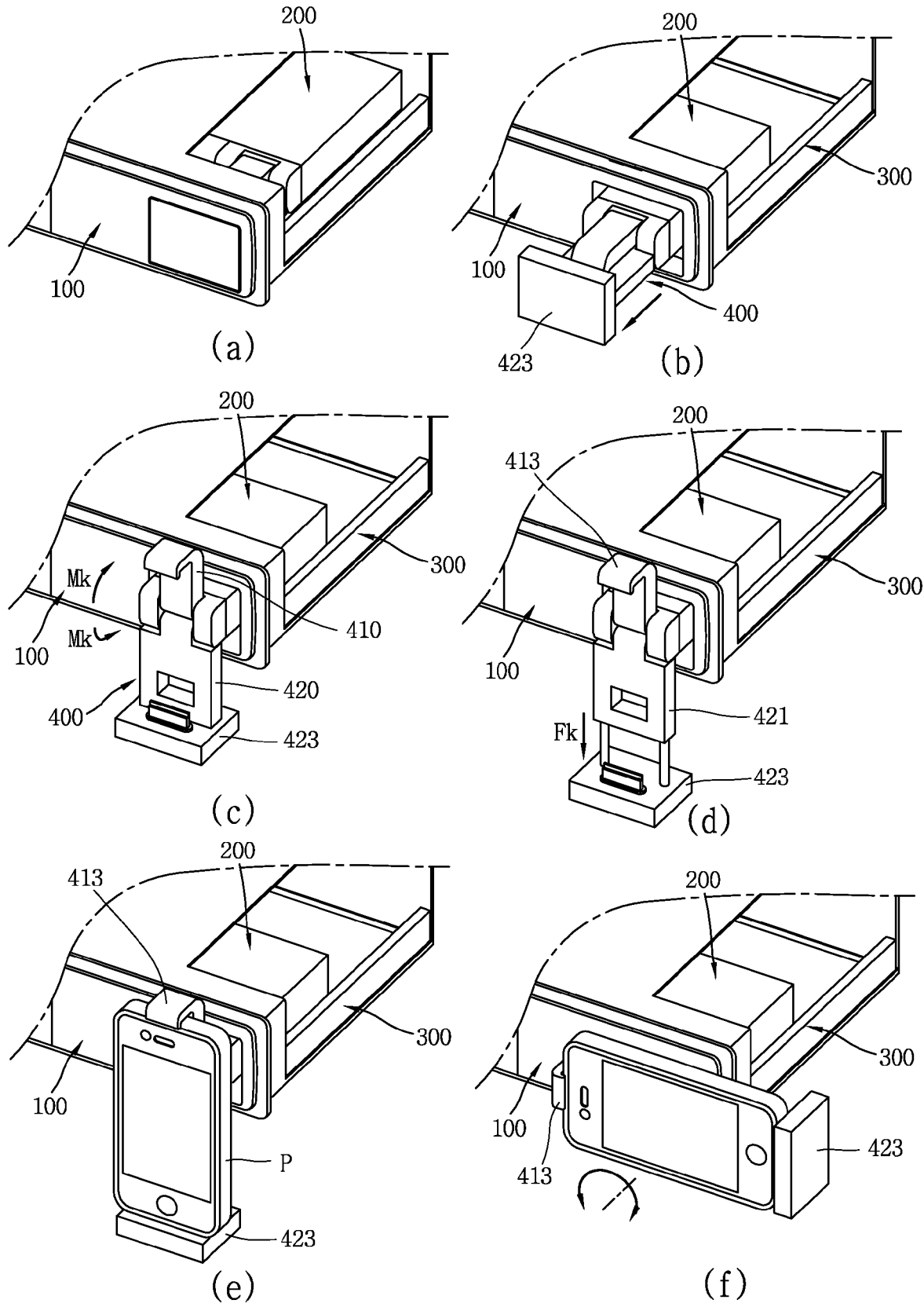
Figure 18:
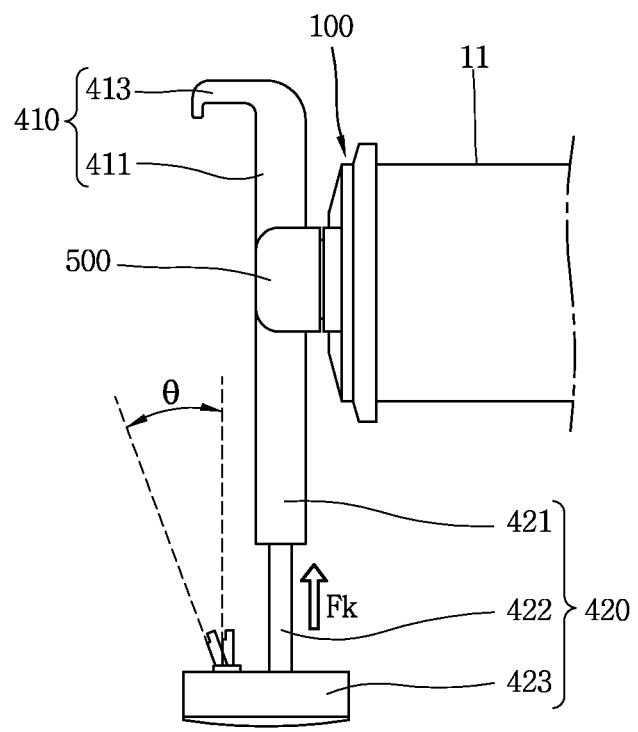
FIGS. 18 and 19 are views illustrating the process of mounting a portable electronic device on the mounting unit of the invention.
Figure 19:
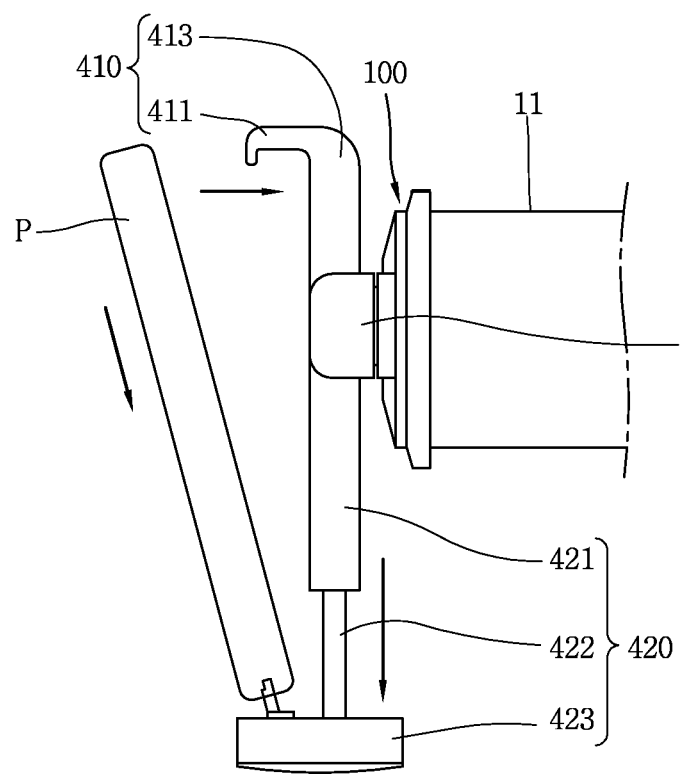

FIG. 15 is a view illustrating a loading unit allowing the mounting apparatus of the invention to be drawn in or out, and FIGS. 16 and 17 are views illustrating the process of drawing a mounting unit out of the mounting apparatus of the invention, and FIGS. 18 and 19 are views illustrating the process of mounting a portable electronic device on the mounting unit of the invention.

First, FIGS. 15 and 16 illustrate working relations in which the mounting unit 400 is drawn out by an operation of the drive unit 200 and loading unit 300. As described above, the operation of the motor 210 of the drive unit 200 allows the loading drive gear 230 to be rotated at a reduced speed in such a manner that the teeth (T1) of the loading drive gear 230 is engaged with the teeth (T2) of the loading gear 310.

Accordingly, the drive unit 200 moves forward by the loading gear 310 of the loading unit 300, and as a result, the mounting unit 400 combined with the drive unit 200 is drawn out of the mounting portion loading hole 130.

In the mounting unit 400 being drawn out as described above, the upper mounting member 410 and lower mounting member 420 are widened through engaging gears by means of an elastic restoring force of the internal torsion spring, and then completely unfolded at last.

Then, after the mounting unit 400 is drawn out as illustrated in FIG. 17, a portable device (P) is mounted thereon while the inserting body 422 is drawn in the downward direction. Then, the horizontal rotation of the mounting rotation member 500 is typically accomplished by mounting the portable device (P) and then rotating the mounting unit 400 together with the portable device (P).

Referring to FIGS. 18 and 19, the mounting unit 400 is drawn out to be unfolded, and then the portable device (P) is mounted thereon while being combined with the connector 4231, and in this case, since the connector 4231 is protruded at a predetermined angle (8) in the forward direction, the user can easily combine the lower end therewith and then pressing it in the backward direction to mount the portable device (P).

In other words, the inserting body 422 is pulled down in the downward direction and then the portable device (P) is pressed in the backward direction while the portable device (P) is combined with the connector 4231 located at a lower end, and in this case, the upper side is pressed to be inserted into the mounting hook 413. If the portable device (P) is closely adhered and pressed to the mounting unit 400 and then its external force is removed, then the portable device (P) is restrained in a vertical direction by an elastic restoring force (Fk) of the tensile elastic member 424 located in the lower mounting member 420. Then, a forward releasement of the mounted portable device (P) is restrained by the restraining protrusion 4131 of the mounting hook 413 at the upper side, and the forward releasement thereof is restrained through the coupling to the connector 4231 at the lower side.

Figure 20:
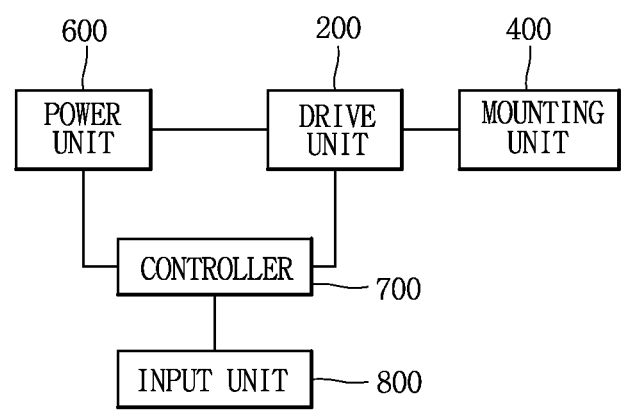
FIG. 20 is a block diagram illustrating the operational system of a mounting apparatus according to the present disclosure.

Hereinafter, a portable electronic device mounting apparatus 10 according to still another embodiment of the present disclosure will be described with reference to FIG. 20. FIG. 20 is a block diagram illustrating the operational system of a mounting apparatus according to the present disclosure.

According to still another embodiment of the present disclosure, the apparatus may include an input unit 800 allowing a user to input whether to operate the apparatus; a mounting unit 400 configured to be automatically drawn in or out by an input function of the input unit 800 to mount a portable electronic device during the drawing-out operation; a drive unit 200 configured to receive power to perform the operation of drawing in or out the mounting unit; and a controller 700 configured to drive the drive unit according to a signal of the input unit to allow the mounting unit to be drawn in or out.

The mounting unit 400 may include an upper mounting member 410 and a lower mounting member 420, and the upper mounting member 410 and lower mounting member 420 may include engaging gears 417, 427 at end portions thereof, respectively, and have a restoring moment in the direction of being unfolded by torsion springs 419, 429, respectively, to be folded during the drawing-in operation and unfolded during the drawing-out operation.

As illustrated in FIG. 20, if the user first presses the loading button 150 of the input unit 800, then the controller 700 detects it, thereby allowing the power unit 600 to supply power to the drive unit 200 while at the same time operating the motor of the drive unit 200.

As a result, the motor of the drive unit 200 is operated to draw out the mounting unit 400, and the upper mounting member 410 and lower mounting member 420 are unfolded by a restoring force of the torsion spring to perform a mounting function of the portable device.

Referring to FIGS. 2, 3 and 20, a portable electronic device mounting apparatus 10 according to the present disclosure may include a case 11 of the audio system provided in the interior of a vehicle; a front panel 100 of the vehicle audio system; a power unit 600 configured to receive power from the power of the vehicle; a mounting unit 400 configured to be automatically drawn in or out by an input function of the input unit to mount a portable electronic device during the drawing-out operation; a drive unit 200 provided within the case to receive power and perform the operation of drawing in or out the mounting unit; and 700 a controller configured to drive the drive unit to allow the mounting unit to be drawn in or out.

Furthermore, the apparatus may further include an input unit 800 allowing a user to input a command indicating whether the mounting unit is drawn in or out.

It may be preferable that the front panel 100 may include an input unit 800 allowing a user to input a command indicating whether the mounting unit is drawn in or out, and a mounting unit loading hole 130 to allow the mounting unit to be drawn in or out.

Furthermore, the input unit 800 is formed with an input loading button 150 provided on the front panel 100. The user simply presses the loading button 150 to operate the drive unit 200, thereby allowing the mounting unit 400 to be drawn out.

However, the input unit 800 may be preferably provided on the front panel, but also installed anywhere in the vehicle if it is a convenient place for the user to manipulate. Here, the receiving device 700 drives the drive unit 200 according to an input signal of the input unit 800 to perform the function of controlling the mounting unit 400 to be drawn in or out.

Furthermore, the mounting unit 400 may include an upper mounting member 410 and a lower mounting member 420, and the upper mounting member 410 and lower mounting member 420 may include engaging gears 417, 427 at end portions thereof, respectively, and have a restoring moment in the direction of being unfolded by torsion springs 419, 429, respectively, to be folded during the drawing-in operation and unfolded during the drawing-out operation.

As a result, the mounting unit 400 is placed under restraint in a configuration that both ends of the upper mounting member 410 and lower mounting member 420 are folded when the mounting unit 400 is drawn in through the mounting unit loading hole 130, and both ends of the upper mounting member 410 and lower mounting member 420 are opened to be unfolded by a restoring elastic force when the mounting unit 400 is drawn out.

The aforementioned embodiments are merely preferred embodiments of the present disclosure to allow persons having ordinary skill in the art to which the present invention pertains (hereinafter, referred to as "those skilled in the art") to easily implement a withdrawable portable electronic device mounting apparatus according to the present disclosure, and the present invention is not limited to the foregoing embodiments and the accompanying drawings, and thus the rights scope of the present invention is not limited thereto. Accordingly, it should be understood by those skilled in the art that various substitutions, modifications and changes can be made without departing from the technical concept of the invention, and it should be also clearly understood that portions which can be easily changed by those skilled in the art will fall in the rights scope of the invention.

What is claimed is:

1. A withdrawable portable electronic device mounting apparatus, the apparatus comprising:
    a case;
    a front panel provided at a front surface of the case to have a control panel, a mounting unit loading hole, and a loading button;
    a drive unit configured to drive a mounting unit through a mounting unit loading hole of the front panel in a withdrawable manner;
    a loading unit mutually operated with the drive unit to allow the mounting unit to be drawn in or out; and
    a mounting unit inserted into the front panel in a folded state during the drawing-in operation, and unfolded through the mounting unit loading hole during the drawing-out operation,
    wherein the mounting unit comprises:
    an upper mounting member and a lower mounting member folded during the drawing-in operation and unfolded during the drawing-out operation.

2. The apparatus of claim 1, wherein the upper mounting member and lower mounting member comprise engaging gears, respectively, and the folding and unfolding operation is implemented by the engaging gears.

3. The apparatus of claim 2, wherein the upper mounting member and lower mounting member comprise torsion springs in the respective engaging gear units, and the upper mounting member and lower mounting member are unfolded by a restoring elastic force during the drawing-out operation.

4. The apparatus of claim 1, wherein the upper mounting member comprises:
    an upper body; and
    a mounting hook formed at an end of the upper body to mount a portable electronic device and then fix it.

5. The apparatus of claim 1, wherein the lower mounting member comprises:
    a lower casing mutually hinge-operated with the upper mounting member;
    an inserting body slidably inserted into the lower casing; and
    a bottom portion fixed and connected to an end of the lower casing to be electrically connected to a fixed portable electronic device.

6. The apparatus of claim 5, wherein the lower casing comprises a sliding protrusion protruded thereinside, and
    the inserting body together with a sliding guide rail into which the sliding protrusion is slid is slidably drawn into the lower casing.

7. The apparatus of claim 5, wherein the lower mounting member comprises a tensile elastic member, maintaining a configuration that the inserting body is inserted into the lower casing by a restoring elastic force, and having a restoring elastic force when the inserting body is slidably drawn from the lower casing.

8. The apparatus of claim 5, wherein the upper mounting member comprises a mounting hook, and
    the lower casing and the inserting body comprise mounting hook inserting holes, respectively, such that the mounting hook of the upper mounting member sequentially passes therethrough to be inserted thereinto in a folded state.

9. The apparatus of claim 5, wherein the bottom portion comprises:
    a bottom portion body fixed and connected to a lower portion of the inserting body;
    a bottom portion cover configured to cover the bottom portion body;
    a connector electrically conducted to a portable electronic device; and
    a connector supporting member integrally formed with the connector to connect to the bottom portion body.

10. The apparatus of claim 9, wherein the connector supporting member comprises a rotation shaft, and
    the bottom portion body comprises a rotation shaft hole such that the connector is hinge-rotated around the rotation shaft.

11. The apparatus of claim 1, further comprising:
    a mounting rotation member formed between the drive unit and the mounting unit, and provided at a mounting panel of the drive unit to be rotationally operated with the mounting panel, and comprising a folding shaft which is a hinge shaft of the folding or unfolding operation of the mounting unit.

12. The apparatus of claim 11, further comprising:
    a click hinge cam rotatably combined with a mounting panel of the drive unit to perform a fixed function at an angle of 90 degrees.

13. The apparatus of claim 1, wherein the drive unit comprises:
    a drive motor configured to transfer power;
    a transfer gear configured to transfer a decelerated rotational force of the drive motor;
    a loading drive gear to allow a mounting unit to be drawn in or out by a rotational force of the drive motor; and
    a mounting panel mounted with the drive motor, transfer gear and loading drive gear to move back and forth in the case.

14. The apparatus of claim 13, wherein the loading unit comprises a loading gear linearly formed to be engaged with the loading drive gear to move the drive unit back and forth according to the rotation of the loading drive gear.

15. A withdrawable portable electronic device mounting apparatus, the apparatus comprising:

a power unit configured to supply power;

an input unit allowing a user to input whether to operate the apparatus;

a mounting unit configured to be automatically drawn in or out by an input function of the input unit to mount a portable electronic device during the drawing-out operation;

a drive unit configured to receive power to perform the operation of drawing in or out the mounting unit; and a controller configured to drive the drive unit according to a signal of the input unit to allow the mounting unit to be drawn in or out, wherein the mounting unit comprises:

an upper mounting member and a lower mounting member folded during the drawing-in operation and unfolded during the drawing-out operation.

16. The apparatus of claim 15, wherein the upper mounting member and lower mounting member comprise engaging gears at end portions thereof, respectively, and have a restoring moment in the direction of being unfolded by torsion springs thereof, respectively, to be folded during the drawing-in operation and unfolded during the drawing-out operation.

17. A withdrawable portable electronic device mounting apparatus incorporated in a vehicle audio system, the apparatus comprising:

a case of the audio system provided in the interior of a vehicle;

a front panel of the vehicle audio system;

a power unit configured to receive power from the power of the vehicle;

a mounting unit configured to be automatically drawn in or out by an input function of the input unit to mount a portable electronic device during the drawing-out operation;

a drive unit provided within the case to receive power and perform the operation of drawing in or out the mounting unit;

a controller configured to drive the drive unit to allow the mounting unit to be drawn in or out; and an input unit allowing a user to input a command indicating whether the mounting unit is drawn in or out, wherein the mounting unit comprises:

an upper mounting member and a lower mounting member folded during the drawing-in operation and unfolded during the drawing-out operation.

18. The apparatus of claim 17, wherein the front panel comprises:

a mounting unit loading hole to allow the mounting unit to be drawn in or out.

19. The apparatus of claim 18, wherein the upper mounting member and lower mounting member comprise engaging gears at end portions thereof, respectively, and have a restoring moment in the direction of being unfolded by torsion springs thereof, respectively, to be folded during the drawing-in operation and unfolded during the drawing-out operation.

* * * * *